(12) United States Patent
Watanabe et al.

(10) Patent No.: US 11,890,992 B2
(45) Date of Patent: Feb. 6, 2024

(54) VEHICLE ELECTRIC FLUID MACHINE

(71) Applicant: KABUSHIKI KAISHA TOYOTA JIDOSHOKKI, Kariya (JP)

(72) Inventors: Ryuji Watanabe, Aichi-ken (JP); Suehiro Fukazawa, Aichi-ken (JP); Noritaka Nishimori, Aichi-ken (JP); Takayuki Kato, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/698,521

(22) Filed: Mar. 18, 2022

(65) Prior Publication Data
US 2022/0306010 A1 Sep. 29, 2022

(30) Foreign Application Priority Data
Mar. 23, 2021 (JP) ................................. 2021-048974

(51) Int. Cl.
*F16F 15/08* (2006.01)
*B60R 11/00* (2006.01)

(52) U.S. Cl.
CPC .............. *B60R 11/00* (2013.01); *F16F 15/08* (2013.01); *B60R 2011/005* (2013.01)

(58) Field of Classification Search
CPC .... B60R 11/00; B60R 2011/005; F16F 15/08; F16F 1/3814; F16F 1/3863; B60H 1/3229; H02K 5/24; H02K 5/00
See application file for complete search history.

(56) References Cited

U.S. PATENT DOCUMENTS

| | | | |
|---|---|---|---|
| 6,820,908 B1 * | 11/2004 | Tousi ..................... | B62D 21/11 248/609 |
| 7,261,365 B2 * | 8/2007 | Dickson ............... | B60G 99/002 296/190.07 |
| 7,416,174 B2 * | 8/2008 | Dickson .................. | F16F 3/093 267/141.1 |
| 8,950,738 B2 | 2/2015 | Nakamura | |
| 2002/0121793 A1* | 9/2002 | Rice ........................ | F16F 15/08 296/35.1 |

FOREIGN PATENT DOCUMENTS

| | | |
|---|---|---|
| JP | 2000-130330 A | 5/2000 |
| JP | 2005-048914 A | 2/2005 |
| JP | 2009-197910 A | 9/2009 |
| JP | 2010-138808 A | 6/2010 |
| JP | 2015-227128 A | 12/2015 |

* cited by examiner

*Primary Examiner* — Terrell L McKinnon
*Assistant Examiner* — Jerry Olivier
(74) *Attorney, Agent, or Firm* — Sughrue Mion, PLLC

(57) ABSTRACT

A vehicle electric fluid machine includes: a housing provided with a mounting leg; a fastener having a shaft portion and a head portion at one end of the shaft portion, the fastener fastening the other end of the shaft portion to a mounting object; a sleeve disposed between the mounting leg and the shaft portion; elastic vibration dampers each having a cylindrical portion and a collar extending from one of opposite ends of the cylindrical portion in its radial outward direction; and an annular plate through which a fastening force is applied to the mounting leg. The annular plate has an elongated protrusion protruding toward the mounting leg, the elongated protrusion spaced from the collar with a predetermined clearance formed radially outside the collar. A deformation limit of the collar is defined by the elongated protrusion being in contact with the collar.

5 Claims, 4 Drawing Sheets

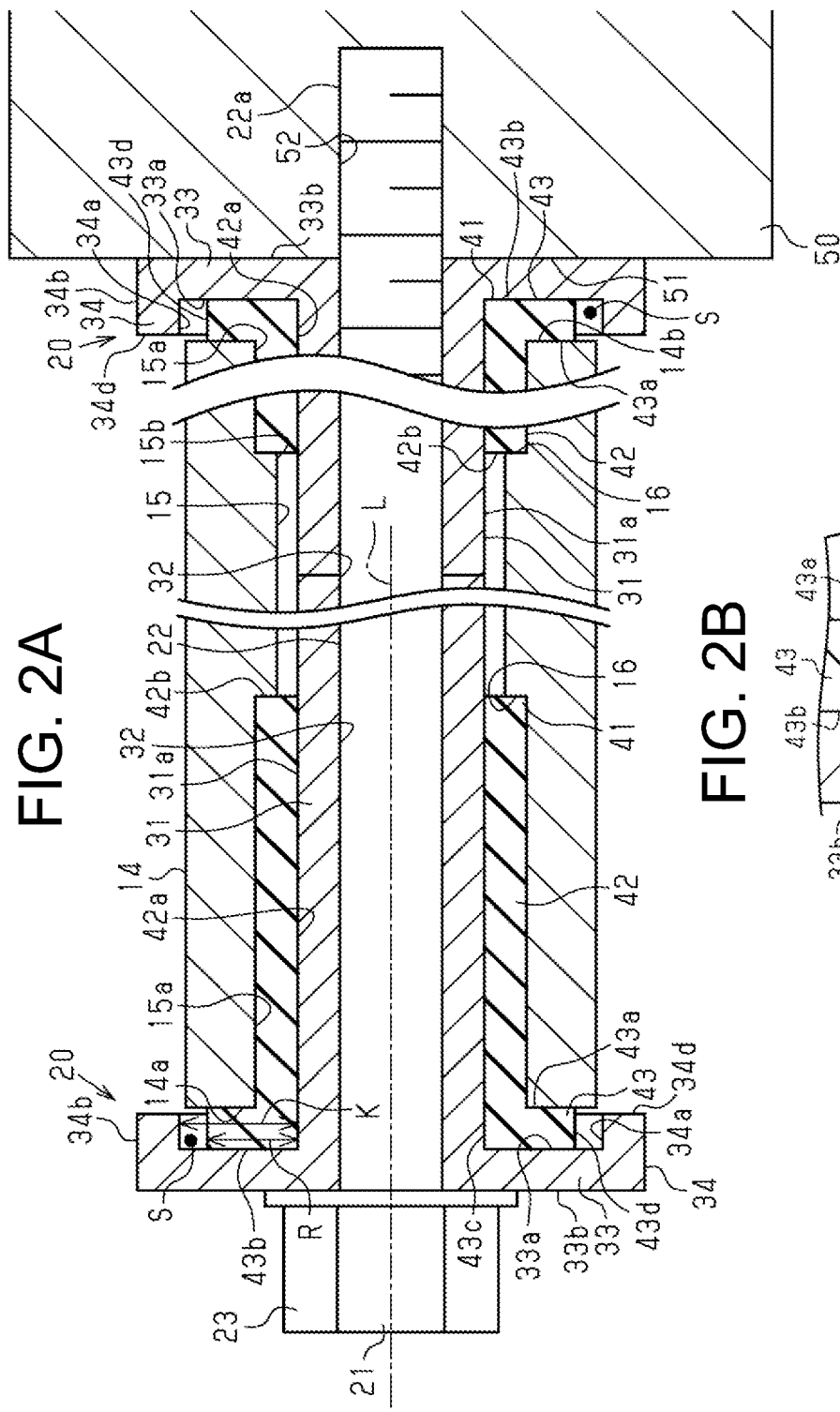
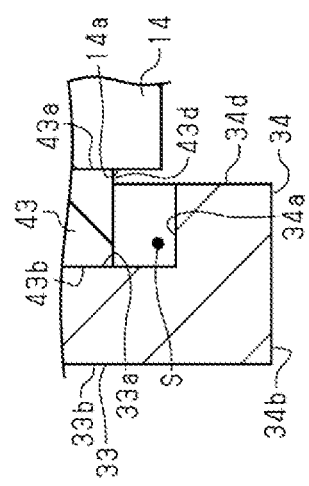

VEHICLE ELECTRIC FLUID MACHINE

CROSS-REFERENCE TO RELATED APPLICATION

This application claims priority to Japanese Patent Application No. 2021-048974 filed on Mar. 23, 2021, the entire disclosure of which is incorporated herein by reference.

BACKGROUND ART

The present disclosure relates to a vehicle electric fluid machine.

A vehicle electric compressor, which is an example of a vehicle electric fluid machine, is mounted to a mounting object of a vehicle. For such mounting, a housing of the vehicle electric compressor has mounting legs. A fastener is inserted through each of the mounting legs and is fastened to a mounting object, thereby mounting the vehicle electric compressor to the mounting object. The vehicle electric compressor has an elastic vibration damper in order to prevent transmission of vibration caused by an operation of an electric motor of the vehicle electric compressor to the vehicle.

In a mounting structure of an electric compressor disclosed in Japanese Patent Application Publication No. 2010-138808, as illustrated in FIG. 6, a fastening bolt 92 serving as a fastener is inserted into a mounting leg 90 of the electric compressor and into a mounting member 91 positioned on an engine side. The fastening bolt 92 has a shaft portion 92a that is screwed into the mounting member 91. A first gap adjustment member 93 serving as an elastic vibration damper is disposed between a head portion 92b of the fastening bolt 92 and one end surface of the mounting leg 90, the first gap adjustment member 93 being pressed and plastically deformed by screwing the fastening bolt 92. A second gap adjustment member 94 serving as an elastic vibration damper is disposed between the other end surface of the mounting leg 90 and the mounting member 91, the second gap adjustment member 94 being pressed and plastically deformed by screwing the fastening bolt 92.

In the mounting structure of the electric compressor disclosed in Japanese Patent Application Publication No. 2010-138808, washers 95 are provided on opposite sides of the mounting leg 90, between the first gap adjustment member 93 and the head portion 92b and between the second gap adjustment member 94 and the mounting member 91, respectively. A collar portion 96 formed of a metal pipe is inserted into the mounting leg 90.

The first gap adjustment member 93 has a cylindrical portion 93a and a flanged portion 93b which are integrally formed with each other, and the second gap adjustment member 94 has a cylindrical portion 94a and a flanged portion 94b which are integrally formed with each other. The cylindrical portions 93a and 94a are arranged between an outer circumferential surface of the collar portion 96 and an inner circumferential surface of the mounting leg 90. The flanged portion 93b of the first gap adjustment member 93 is disposed between one of the washers 95 and one end surface of the mounting leg 90. The flanged portion 94b of the second gap adjustment member 94 is disposed between the other of the washers 95 and the other end surface of the mounting leg 90.

For vibration of the housing of the electric compressor, the flanged portions 93b and 94b damp a component of vibration in a direction parallel to an axial direction of the fastening bolt 92. The cylindrical portions 93a and 94a damp a component of vibration in a direction perpendicular to the axial direction of the fastening bolt 92.

Vibration of the housing of the electric compressor causes elastic deformation of the flanged portions 93b and 94b in the direction perpendicular to the axial direction of the fastening bolt 92. At this time, the larger elastic deformation of the flanged portions 93b and 94b in a radial outward direction of the flanged portion 93b and 94b is, the more stress concentration near a boundary between the flanged portion 93b and the cylindrical portion 93a and a boundary between the flanged portion 94b and the cylindrical portion 94a increases. This may result in damages to a part of the first gap adjustment member 93 near the boundary between the flanged portion 93b and the cylindrical portion 93a, and damages to a part of the second gap adjustment member 94 near the boundary between the flanged portion 94b and the cylindrical portion 94a.

SUMMARY

In accordance with an aspect of the present disclosure, there is provided a vehicle electric fluid machine including: a housing that accommodates an electric motor and has a mounting leg, the mounting leg having an insertion hole extending through end surfaces of the mounting leg in an axial direction of the mounting leg; a fastener that has a shaft portion inserted into the insertion hole and a head portion at one end of the shaft portion, the fastener fastening the other end of the shaft portion to a mounting object so that the mounting leg is mounted to the mounting object; a sleeve that is disposed between the mounting leg and the shaft portion and that receives a fastening force from the head portion; elastic vibration dampers disposed on opposite sides of the mounting leg in the axial direction of the mounting leg, each of the elastic vibration dampers having a cylindrical portion disposed between an inner circumferential surface of the mounting leg and an outer circumferential surface of the sleeve, and a collar extending from one of opposite ends of the cylindrical portion in a radial outward direction of the cylindrical portion; and an annular plate through which the fastening force received by the sleeve is applied to the mounting leg through the collar. Each of the elastic vibration dampers is disposed in the mounting leg without adhering to the sleeve and the annular plate. The annular plate has an elongated protrusion protruding toward the mounting leg, the elongated protrusion spaced from the collar with a predetermined clearance formed radially outside the collar. A deformation limit of the collar is defined by the elongated protrusion being in contact with the collar during vibration of the housing.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which:

FIG. 2A is a cross-sectional view of a mounting structure of a mounting leg, and FIG. 2B is an enlarged cross-sectional view of a collar and an elongated protrusion;

DETAILED DESCRIPTION OF THE EMBODIMENTS

The following will describe an embodiment of a vehicle electric compressor serving as a vehicle electric fluid machine with reference to FIG. 1 to FIG. 5. The vehicle electric compressor is used for a vehicle air conditioner.

Figure 1:
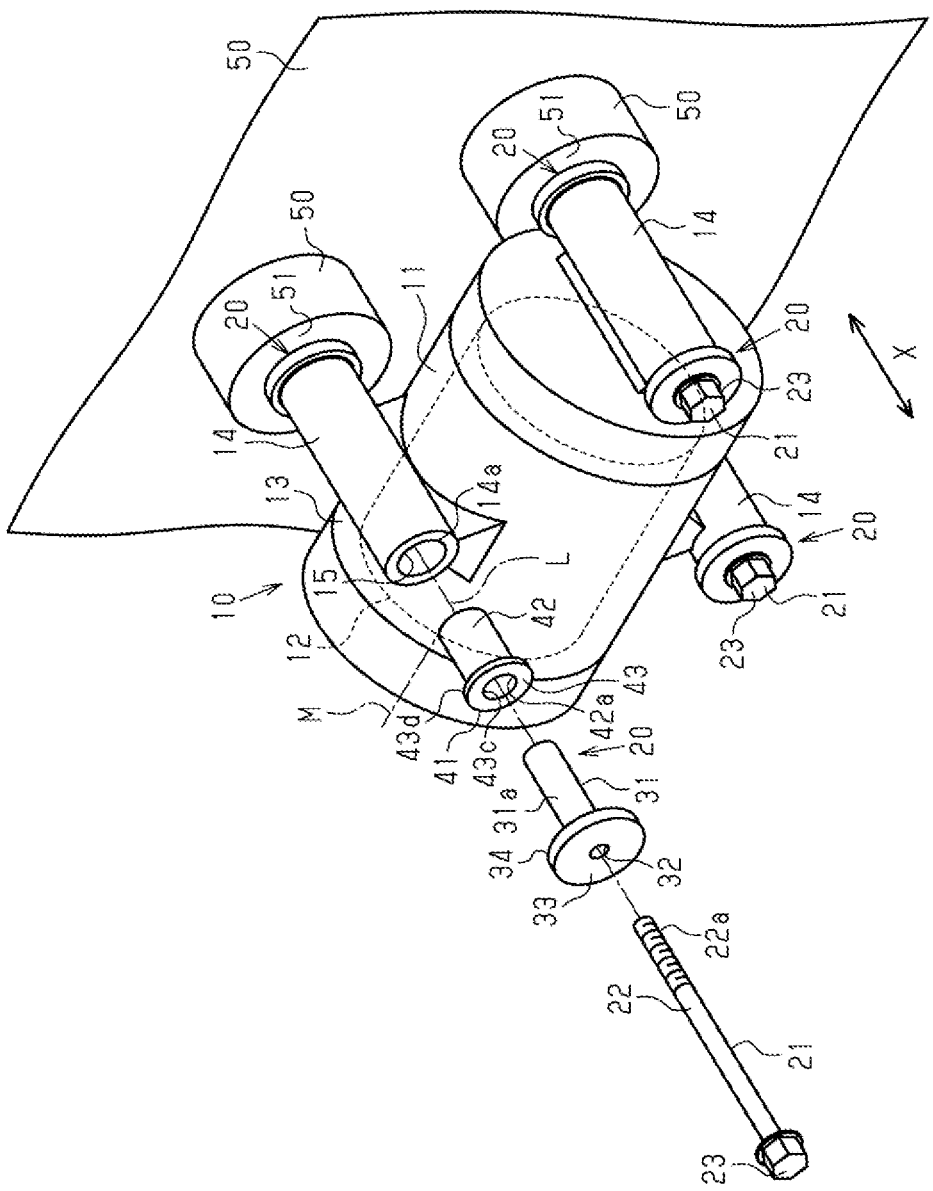
FIG. 1 is an exploded perspective view of a vehicle electric compressor and a vibration damping device.

As illustrated in FIG. 1, a vehicle electric compressor 10 includes a housing 11, an electric compression mechanism (not illustrated) including an electric motor 12, and vibration damping devices 20. The housing 11 has an accommodating portion 13 having a cylindrical shape and a plurality of mounting legs 14. The plurality of mounting legs 14 is for mounting the housing 11 to a mounting object 50 which is a part of a vehicle (not illustrated). The accommodating portion 13 accommodates the electric compression mechanism including the electric motor 12. That is, the housing 11 accommodates the electric motor 12.

The electric compression mechanism includes, in addition to the electric motor 12, a rotary shaft, a compression part connected to an end of the rotary shaft, and an inverter, which are not illustrated. The housing 11 has a suction port from which a refrigerant as fluid is drawn and a discharge port from which the refrigerant is discharged. The housing 11 supports the rotary shaft in a rotatable manner. In the electric compression mechanism, the rotary shaft is rotationally driven by the electric motor 12. Along with rotation of the rotary shaft, the refrigerant drawn into the housing 11 from the suction port of the housing 11 is compressed, and such a compressed refrigerant is discharged from the discharge port of the housing 11 to an outside of the housing 11.

The mounting legs 14 each have a cylindrical shape. The mounting legs 14 each have a central axis L whose extending direction corresponds to an axial direction X of each of the mounting legs 14. The central axis L of each of the mounting legs 14 is perpendicular to an axis M of the accommodating portion 13. The mounting legs 14 are disposed on the accommodating portion 13 so that central axes L of the mounting legs 14 are parallel to each other. Since the mounting legs 14 have the same configuration, one of the mounting legs 14 will be described, and two of the mounting legs 14 will not be described hereinafter.

As illustrated in FIG. 2A, the mounting leg 14 has an insertion hole 15. The insertion hole 15 extends through the mounting leg 14 in its axial direction X. The insertion hole 15 is formed of large diameter holes 15a positioned on opposite sides of the mounting leg 14 in its axial direction X and a small diameter hole 15b positioned between the large diameter holes 15a. The mounting leg 14 has annular surfaces 16 at opposite ends of the small diameter hole 15b. Each of the annular surfaces 16 connects an inner circumferential surface of each of the large diameter holes 15a and an inner circumferential surface of the small diameter hole 15b.

The mounting leg 14 has opposite end surfaces, a first end surface 14a and a second end surface 14b, on opposite ends of the mounting leg 14 in the axial direction X. The first end surface 14a and the second end surface 14b each have an annular shape surrounding the insertion hole 15. Therefore, the mounting leg 14 has the insertion hole 15 extending through the first end surface 14a and the second end surface 14b.

The insertion hole 15 has its openings on the first end surface 14a and the second end surface 14b of the mounting leg 14. Each of the first end surface 14a and the second end surface 14b is a flat surface perpendicular to the central axis L of the mounting leg 14. The second end surface 14b of the mounting leg 14 is adjacent to the mounting object 50, so that the vehicle electric compressor 10 is mounted to the mounting object 50. The mounting object 50 has an internally threaded portion 52 extending in the axial direction X from an adjacent surface 51 adjacent to the second end surface 14b of the mounting leg 14.

Next, the vibration damping devices 20 provided on opposite ends of the mounting leg 14 will be described. One of the vibration damping devices 20 is provided on the first end surface 14a of the mounting leg 14, and the other of the vibration damping devices 20 is provided on the second end surface 14b of the mounting leg 14. The vibration damping devices 20 have the same structure. Thus, a configuration of one of the vibration damping devices 20 will be described, and the other of the vibration damping devices 20 will not be described.

Figure 3:
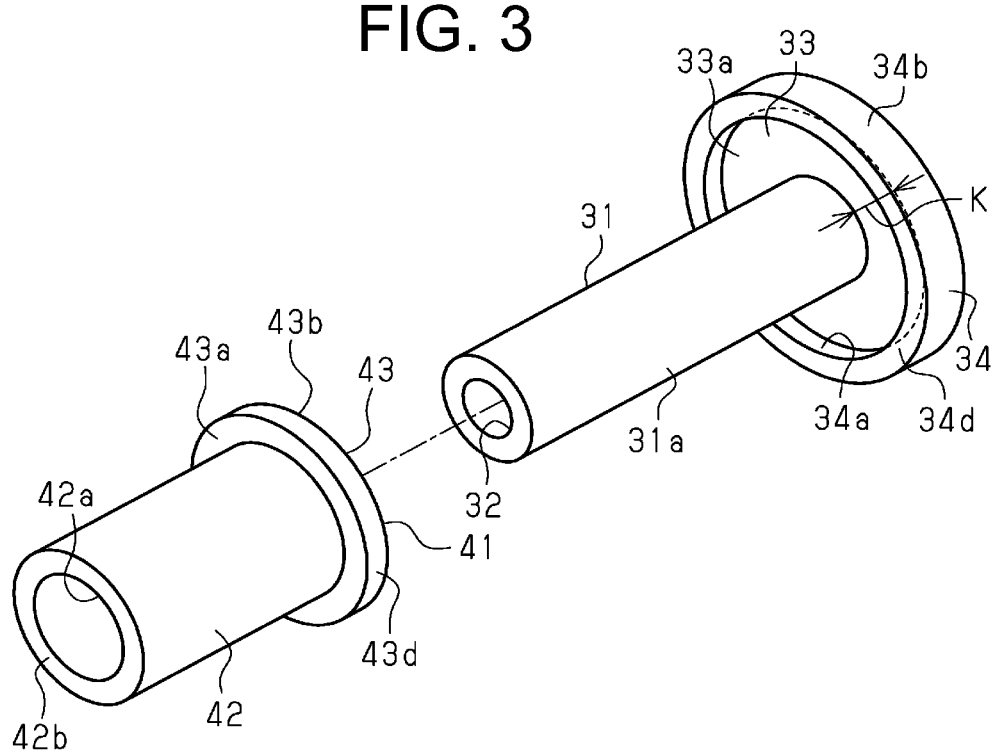
FIG. 3 is a perspective view of an elastic vibration damper and a sleeve.

As illustrated in FIG. 1, FIG. 2A, and FIG. 3, a fastener 21 corresponding to a bolt is used to fasten the mounting leg 14 to the mounting object 50, thereby attaching the vibration damping devices 20 to the opposite ends of the mounting leg 14, respectively.

The fastener 21 is made of metal. The fastener 21 has a shaft portion 22 inserted into the insertion hole 15 and has a head portion 23 at one end of the shaft portion 22. The shaft portion 22 has an externally threaded portion 22a on an outer circumferential surface at the other end of the shaft portion 22. The externally threaded portion 22a at the other end of the shaft portion 22 is screwed into the internally threaded portion 52 of the mounting object 50, whereby the fastener 21 mounts the mounting leg 14 to the mounting object 50.

The vibration damping device 20 has a sleeve 31, a flange 33 serving as an annular plate, an elongated protrusion 34, and an elastic vibration damper 41.

The sleeve 31 is made of metal. The sleeve 31 has a cylindrical shape. The sleeve 31 is integrally formed with the flange 33 made of metal. The flange 33 extends in a radial direction of the sleeve 31 from one of opposite ends of the sleeve 31 in an axial direction of the sleeve 31.

The sleeve 31 has an outer diameter that is smaller than a diameter of the small diameter hole 15b. The sleeve 31 is inserted into the insertion hole 15 of the mounting leg 14. The sleeve 31 has a sleeve hole 32. The sleeve hole 32 extends through the sleeve 31 in the axial direction of the sleeve 31. The shaft portion 22 of the fastener 21 is inserted into the sleeve hole 32. Thus, the shaft portion 22 of the fastener 21 is inserted through the sleeve 31. Therefore, the sleeve 31 is positioned between the outer circumferential surface of the shaft portion 22 and an inner circumferential surface of the mounting leg 14. That is, the sleeve 31 is positioned between the mounting leg 14 and the shaft portion 22.

The flange 33 radially extends in a disk shape from the one of opposite ends of the sleeve 31 in the axial direction of the sleeve 31. The sleeve 31 and the flange 33 are made of the same metal material. The flange 33 having the disk shape has the sleeve hole 32 made at the center of the flange 33. The flange 33 has opposite surfaces, a first contact surface 33a and a second contact surface 33b, in a thickness direction of the flange 33. The first contact surface 33a is an annular surface continuous with an outer circumferential surface of the sleeve 31. The second contact surface 33b is an annular surface positioned opposite to the first contact surface 33a.

The flange 33 has the elongated protrusion 34 protruding from the flange 33 toward the mounting leg 14. The elongated protrusion 34 has a cylindrical shape concentric with the sleeve 31. As illustrated in FIG. 2B, the elongated protrusion 34 has an inner circumferential surface 34a intersecting and being continuous with the first contact surface 33a.

As illustrated in FIG. 2A and FIG. 3, a minimum distance from the inner circumferential surface 34a of the elongated protrusion 34 to an outer circumferential surface 31a of the sleeve 31 is defined as a spaced distance K of the elongated protrusion 34. The spaced distance K of the elongated protrusion 34 is constant along a circumferential direction of the flange 33.

The elongated protrusion 34 has an outer circumferential surface 34b intersecting and being continuous with the second contact surface 33b. The elongated protrusion 34 has an end surface 34d at a distal end of the elongated protrusion 34 in a protruding direction from the flange 33 toward the mounting leg 14. The end surface 34d has an annular surface.

The elastic vibration damper 41 is made of an elastic material. The elastic material is rubber, for example. The elastic vibration damper 41 damps vibration of the housing 11 caused by an operation of the electric motor 12, thereby preventing transmission of such vibration to the vehicle through the housing 11.

The elastic vibration damper 41 has a cylindrical portion 42 and a collar 43 having a disk shape. An outer diameter of the cylindrical portion 42 is smaller than a diameter of the large diameter hole 15a. An inner diameter of the cylindrical portion 42 is smaller than a diameter of the small diameter hole 15b. The cylindrical portion 42 has an insertion hole 42a. The insertion hole 42a extends through the elastic vibration damper 41 in an axial direction of the cylindrical portion 42. The cylindrical portion 42 has a distal end surface 42b at one end of the cylindrical portion 42 in the axial direction of the cylindrical portion 42, and the collar 43 is provided at the other end of the cylindrical portion 42 in the axial direction of the cylindrical portion 42. A dimension of the cylindrical portion 42 in the axial direction of the cylindrical portion 42 is smaller than that of the sleeve 31 in the axial direction of the sleeve 31.

The collar 43 extends radially from the other end of the cylindrical portion 42 in its axial direction toward an outside of the cylindrical portion 42. The collar 43 has a disk shape and has the insertion hole 42a made at the center of the collar 43. The collar 43 has opposite surfaces, a first holding surface 43a and a second holding surface 43b, in a thickness direction of the collar 43. The first holding surface 43a having an annular shape is continuous with an outer circumferential surface of the cylindrical portion 42. The first holding surface 43a is in contact with an end surface of the mounting leg 14. The second holding surface 43b having an annular shape is positioned opposite to the first holding surface 43a.

The second holding surface 43b is in contact with the first contact surface 33a of the flange 33. A minimum distance from an inner circumferential surface 43c to an outer circumferential surface 43d of the collar 43 is defined as a width R of the collar 43. The width R of the collar 43 is smaller than the spaced distance K from the outer circumferential surface 31a of the sleeve 31 to the inner circumferential surface 34a of the elongated protrusion 34. On each side of the first end surface 14a and the second end surface 14b of the mounting leg 14, the minimum distance from the inner circumferential surface of the insertion hole 15 to the outer circumferential surface of the mounting leg 14 is larger than the width R of the collar 43.

Next, a mounting structure of the mounting leg 14 provided with the vibration damping devices 20 will be described.

As illustrated in FIG. 2A, on the second end surface 14b side of the mounting leg 14, the cylindrical portion 42 of the elastic vibration damper 41 is inserted into the large diameter hole 15a of the mounting leg 14. The distal end surface 42b of the cylindrical portion 42 is in contact with one of the annular surfaces 16 on the second end surface 14b side. The first holding surface 43a of the collar 43 is in contact with the second end surface 14b of the mounting leg 14. The outer circumferential surface 43d of the collar 43 is located radially inside the outer circumferential surface of the mounting leg 14.

The sleeve 31 is inserted into the insertion hole 42a of the elastic vibration damper 41. Thus, the cylindrical portion 42 of the elastic vibration damper 41 is disposed between the inner circumferential surface of the mounting leg 14 and the outer circumferential surface of the sleeve 31. The sleeve 31 is inserted through the distal end surface 42b of the cylindrical portion 42 and into an inner part of the mounting leg 14. The first contact surface 33a of the flange 33 is in contact with the second holding surface 43b of the collar 43. The second contact surface 33b of the flange 33 is in contact with the adjacent surface 51 of the mounting object 50. The elastic vibration damper 41 does not adhere to the sleeve 31 and the flange 33, and the elastic vibration damper 41 is axially and radially movable relative to the sleeve 31 and the flange 33. Thus, the elastic vibration damper 41 is disposed in the mounting leg 14 without adhering to the sleeve 31 and the flange 33.

As illustrated FIG. 2B, the inner circumferential surface 34a that is an inner surface of the elongated protrusion 34 is spaced from the outer circumferential surface 43d of the collar 43. That is, the flange 33 has the elongated protrusion 34 spaced from the collar 43 with a predetermined clearance S formed radially outside the collar 43. Thus, the predetermined clearance S having an annular shape is defined between the inner circumferential surface 34a of the elongated protrusion 34 and the outer circumferential surface 43d of the collar 43. The elongated protrusion 34 protrudes from the flange 33 toward the mounting leg 14. The end surface 34d of the elongated protrusion 34 is spaced from the second end surface 14b of the mounting leg 14 in the axial direction X.

On the first end surface 14a side, the cylindrical portion 42 of the elastic vibration damper 41 is inserted into the large diameter hole 15a of the mounting leg 14. The distal end surface 42b of the cylindrical portion 42 is in contact with the other of the annular surfaces 16 on the first end surface 14a side. The first holding surface 43a of the collar 43 is in contact with the first end surface 14a of the mounting leg 14. The outer circumferential surface 43d of the collar 43 is located radially inside the outer circumferential surface of the mounting leg 14.

The sleeve 31 is inserted into the insertion hole 42a of the elastic vibration damper 41. Thus, the cylindrical portion 42 of the elastic vibration damper 41 is disposed between the inner circumferential surface of the mounting leg 14 and the outer circumferential surface of the sleeve 31. The sleeve 31 is inserted through the distal end surface 42b of the cylindrical portion 42 and into the inner part of the mounting leg 14. The first contact surface 33a of the flange 33 is in contact with the second holding surface 43b of the collar 43.

Two sleeves 31 are inserted into the mounting leg 14 from the first end surface 14a side and from the second end surface 14b side, respectively, and respective distal end surfaces of the two sleeves 31 are in contact with each other inside the mounting leg 14.

The inner circumferential surface 34a of the elongated protrusion 34 is spaced from the outer circumferential surface 43d of the collar 43. That is, the flange 33 has the elongated protrusion 34 spaced from the collar 43 with a predetermined clearance S formed radially outside the collar 43. Thus, the predetermined clearance S having an annular shape is defined between the inner circumferential surface 34a of the elongated protrusion 34 and the outer circumferential surface 43d of the collar 43. The elongated protrusion 34 protrudes from the flange 33 toward the mounting leg 14. The end surface 34d of the elongated protrusion 34 is spaced from the first end surface 14a of the mounting leg 14 in the axial direction X.

A dimension of the predetermined clearance S along a radial direction of the elastic vibration damper 41 is set to define a deformation limit of the collar 43 and to reduce excessive deformation of the collar 43 when the collar 43 is deformed in a radial outward direction of the collar 43 due to stress to the elastic vibration damper 41 in its axial direction. In order to define the deformation limit of the collar 43, the elongated protrusion 34 is spaced from the collar 43 with the predetermined clearance S formed radially outside the collar 43.

The two sleeves 31 each have the sleeve hole 32 into which the shaft portion 22 of the fastener 21 is inserted. The externally threaded portion 22a of the shaft portion 22 is screwed into the internally threaded portion 52 of the mounting object 50 to be fastened to the mounting object 50. The sleeve 31 receives a fastening force from the head portion 23 of the fastener 21. Such fastening force received by the sleeve 31 is applied to the mounting leg 14 through the flange 33 and the collar 43. As a result, the fastening force from the head portion 23 causes the elastic vibration damper 41 to be pressed in the axial direction of the elastic vibration damper 41.

Accordingly, the first holding surface 43a comes in contact with the first end surface 14a or the second end surface 14b, and the second holding surface 43b comes in contact with the first contact surface 33a of the flange 33. The collar 43 is held between the mounting leg 14 and the flange 33 in the axial direction X, and receives stress in the axial direction X. The cylindrical portion 42 receives stress between the annular surface 16 and the flange 33 in the axial direction X of the mounting leg 14.

Next, operations of the vehicle electric compressor 10 will be described.

In the housing 11 of the vehicle electric compressor 10, vibration is caused by an operation of the electric motor 12. During such vibration in the housing 11, the cylindrical portion 42 and the collar 43 of the elastic vibration damper 41 damp a component of vibration in a direction parallel to an axial direction of the fastener 21. The cylindrical portion 42 damps a component of vibration in a direction perpendicular to the axial direction of the fastener 21. This can prevent transmission of the vibration of the housing 11 to the mounting object 50.

Figure 4:
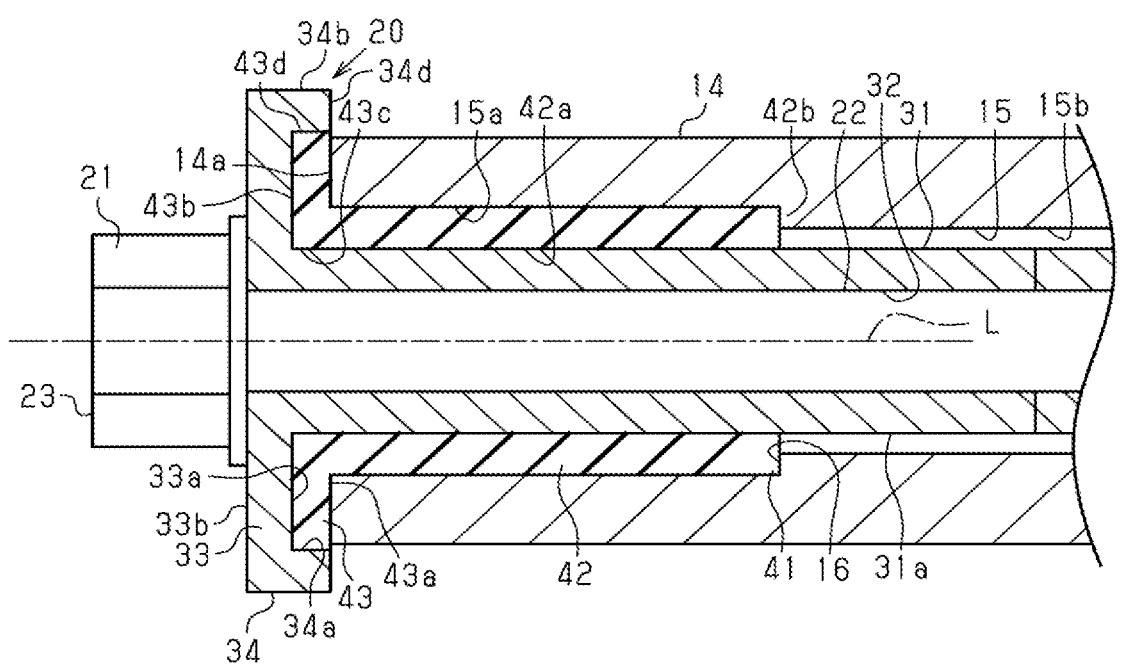
FIG. 4 is a cross-sectional view of the vibration damping device during vibration.

As illustrated in FIG. 4, when the elastic vibration damper 41 receives the above-described components of vibration, the collar 43 receives stress between the flange 33 and the first end surface 14a or the second end surface 14b of the mounting leg 14, which causes elastic deformation of the collar 43. At this time, the outer circumferential surface 43d of the collar 43 elastically deformed in a radial outward direction of the collar 43 is in contact with the inner circumferential surface 34a of the elongated protrusion 34, which defines the deformation limit of the collar 43. As a result, deformation of the collar 43 is limited.

The following effects can be obtained according to the present embodiment.

(1) The flange 33 has the elongated protrusion 34 spaced from the collar 43 with the predetermined clearance S formed radially outside the collar 43. Accordingly, when the elastic vibration damper 41 receives the components of vibration and the collar 43 is elastically deformed due to stress, the collar 43 elastically deformed comes in contact with the elongated protrusion 34, thereby limiting deformation of the collar 43 in the radial outward direction of the collar 43. That is, the elongated protrusion 34 can prevent excessive deformation of the collar 43 in the radial outward direction of the collar 43. This can reduce stress concentration generated in the elastic vibration damper 41 near a boundary between the cylindrical portion 42 and the collar 43, and can reduce damage of the elastic vibration damper 41 near the boundary between the cylindrical portion 42 and the collar 43 due to the stress concentration. As a result, durability deterioration of the elastic vibration damper 41 can be reduced.

(2) Before the elastic vibration damper 41 receives the components of vibration, a predetermined clearance S exists between the outer circumferential surface 43d of the collar 43 and the inner circumferential surface 34a of the elongated protrusion 34. This allows the collar 43 to slightly deform in the radial outward direction of the collar 43 upon reception of the components of vibration by the elastic vibration damper 41, which can allow elastic deformation of the elastic vibration damper 41. Therefore, elastic deformation of the elastic vibration damper 41 is utilized to effectively exert vibration damping function.

(3) The dimension of the predetermined clearance S along the radial direction of the elastic vibration damper 41 is set to define the deformation limit of the collar 43 when the collar 43 is deformed in the radial outward direction of the collar 43. Therefore, when the elastic vibration damper 41 receives the components of vibration, excessive deformation of the collar 43 can be limited while allowing small deformation of the collar 43 in its radial outward direction.

(4) The end surface 34d of the elongated protrusion 34 is spaced from the first end surface 14a or the second end surface 14b of the mounting leg 14 in the axial direction X. Even when the collar 43 is deformed and becomes thin to the extent of being in contact with the elongated protrusion 34 due to stress to the elastic vibration damper 41 in the axial direction, the end surface 34d is not in contact with the first end surface 14a or the second end surface 14b of the mounting leg 14. This prevents noise to be generated by the elongated protrusion 34 being in contact with the mounting leg 14.

(5) The elongated protrusion 34 extends along an entire circumference of the flange 33, and covers an entire circumference of the outer circumferential surface 43d of the collar 43. Accordingly, the deformation limit of the collar 43 can be defined through the entire circumference of the collar 43, and localized deformation of the collar 43 can be reduced. This can reduce stress concentration caused by localized deformation of the elastic vibration damper 41, and can reduce durability deterioration due to damage of the elastic vibration damper 41.

(6) The elastic vibration damper 41 does not adhere to the sleeve 31 and the flange 33. This eliminates a process in which the elastic vibration damper 41 is vulcanized and adheres to the sleeve 31 and the flange 33, thereby saving a cost of the vehicle electric compressor 10. Since the elastic vibration damper 41 does not adhere to the sleeve 31 and the flange 33, the collar 43 is deformed in the radial outward direction of the collar 43 upon reception of the components of vibration by the elastic vibration damper 41, but the elongated protrusion 34 can limit deformation of the collar 43 in the radial outward direction of the collar 43. This can reduce durability deterioration due to damage of the elastic vibration damper 41 while saving the cost of the vehicle electric compressor 10.

The above-described embodiment can be modified and implemented as follows. The above-described embodiment and the following modified embodiments can be implemented in combination with each other to the extent that there is no technical contradiction.

Figure 5:
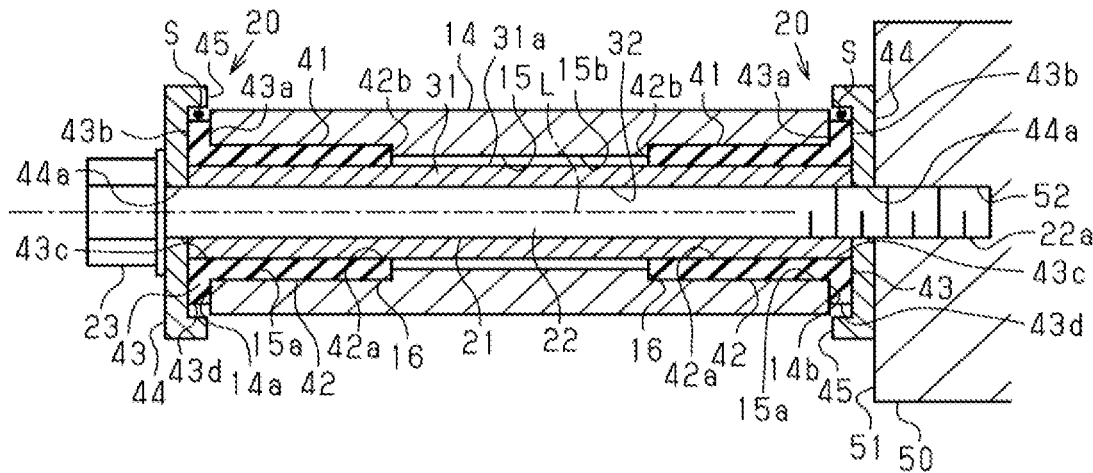
FIG. 5 is a cross-sectional view of a vibration damping device of a modified embodiment.
Figure 6:
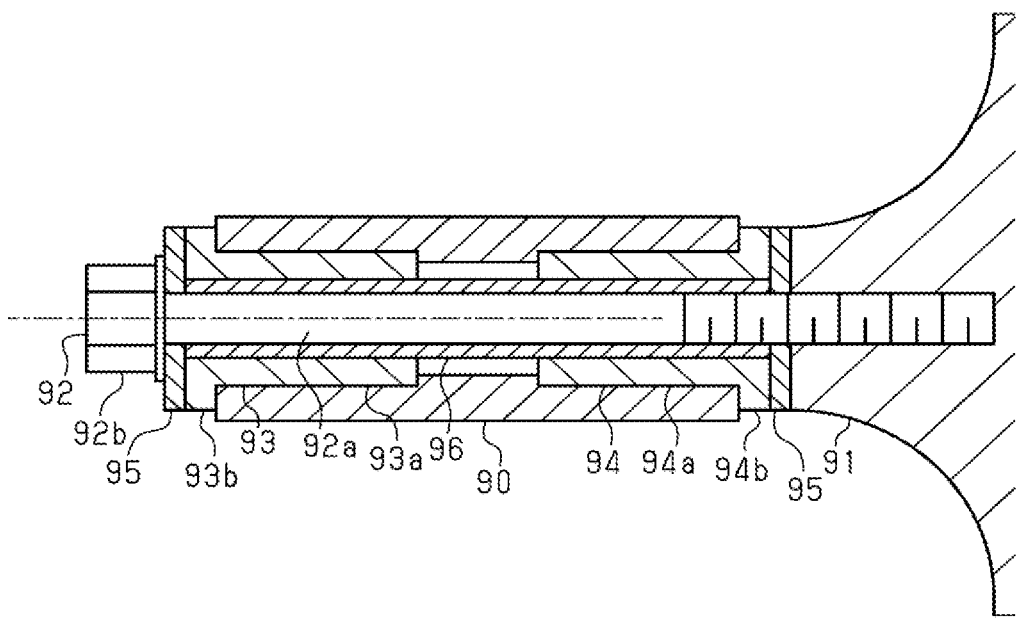
FIG. 6 is a drawing of a background art of the present disclosure.

As illustrated in FIG. 5, a flange 33 may be eliminated from a sleeve 31; instead, washers 44 may each serve as an annular plate. In this case, one of the washers 44 is disposed between a head portion 23 and one end surface of the sleeve 31 in an axial direction of the sleeve 31, and the other of the washers 44 is disposed between a mounting object 50 and the other end surface of the sleeve 31 in the axial direction of the sleeve 31.

Each of the washers 44 may have an elongated protrusion 45. Each of the washers 44 has, at its center, a through hole 44a through which a shaft portion 22 of a fastener 21 is inserted. The elongated protrusion 45 extends along an outer circumferential edge of each of the washers 44. The elongated protrusion 45 may extend along an entire circumference of each of the washers 44, or a plurality of elongated protrusions 45 may be spaced therebetween along a circumferential direction of each of the washers 44.

Since the elongated protrusion 45 is formed in each of the washers 44 reducing looseness of the head portion 23 of the fastener 21, excessive elastic deformation of the collar 43 can be reduced without increasing the number of parts.

The elongated protrusion 34 may be spaced along the circumferential direction of the flange 33. In this case, when the collar 43 is elastically deformed due to stress to the collar 43 upon reception of components of vibration by an elastic vibration damper 41, an outer circumferential surface 43d of the collar 43 elastically deformed is in contact with an inner circumferential surface of the elongated protrusion 34.

As long as a deformation limit of the collar 43 is defined by the elongated protrusion 34 being in contact with the collar 43 at a time of reception of the components of vibration by the elastic vibration damper 41, the collar 43 may be in contact with the elongated protrusion 34 before reception of the components of vibration. In this case, a predetermined clearance S is not formed between the collar 43 and the elongated protrusion 34.

The end surface 34d of the elongated protrusion 34 may be in contact with the first end surface 14a or the second end surface 14b of the mounting leg 14 before the elastic vibration damper 41 receives the components of vibration.

The vehicle electric compressor 10 may compress fluid other than a refrigerant, such as air.

The vehicle electric fluid machine is not limited to be used for the vehicle electric compressor 10 including a compression part that compresses fluid. For example, when the vehicle electric fluid machine is mounted on a fuel cell vehicle, the vehicle electric fluid machine may be an electric pump system including a pump that supplies hydrogen to a fuel cell and a vehicle electric motor that drives the pump.

What is claimed is:

1. A vehicle electric fluid machine comprising:
a housing that accommodates an electric motor and has a mounting leg, the mounting leg having an insertion hole extending through end surfaces of the mounting leg in an axial direction of the mounting leg;
a fastener that has a shaft portion inserted into the insertion hole and a head portion at one end of the shaft portion, the fastener fastening the other end of the shaft portion to a mounting object so that the mounting leg is mounted to the mounting object;
a sleeve that is disposed between the mounting leg and the shaft portion and that receives a fastening force from the head portion;
elastic vibration dampers disposed on opposite sides of the mounting leg in the axial direction of the mounting leg, each of the elastic vibration dampers having a cylindrical portion disposed between an inner circumferential surface of the mounting leg and an outer circumferential surface of the sleeve, and a collar extending from one of opposite ends of the cylindrical portion in a radial outward direction of the cylindrical portion; and
an annular plate through which the fastening force received by the sleeve is applied to the mounting leg through the collar, wherein
each of the elastic vibration dampers is disposed in the mounting leg without adhering to the sleeve and the annular plate,
the annular plate has an elongated protrusion protruding toward the mounting leg, the elongated protrusion spaced from the collar with a predetermined clearance formed radially outside the collar, and
a deformation limit of the collar is defined by the elongated protrusion being in contact with the collar during vibration of the housing,
wherein a length of the elongated protrusion is at least equal to a length of the collar and the elongated protrusion is in contact with the collar.

2. The vehicle electric fluid machine according to claim 1, wherein
the elongated protrusion has an end surface at a distal end of the elongated protrusion in a protruding direction from the annular plate toward the mounting leg, and
the end surface of the elongated protrusion is spaced from each of the end surfaces of the mounting leg in a state in which the elongated protrusion is in contact with the collar.

3. The vehicle electric fluid machine according to claim 1, wherein
the sleeve is provided with a flange radially extending from one of opposite ends of the sleeve in an axial direction of the sleeve, and
the annular plate is the flange.

4. The vehicle electric fluid machine according to claim 1, wherein
the annular plate is a washer.

5. A vehicle electric fluid machine comprising:
a housing that accommodates an electric motor and has a mounting leg, the mounting leg having an insertion hole extending through end surfaces of the mounting leg in an axial direction of the mounting leg;
a fastener that has a shaft portion inserted into the insertion hole and a head portion at one end of the shaft portion, the fastener fastening the other end of the shaft portion to a mounting object so that the mounting leg is mounted to the mounting object;
a sleeve that is disposed between the mounting leg and the shaft portion and that receives a fastening force from the head portion;
elastic vibration dampers disposed on opposite sides of the mounting leg in the axial direction of the mounting leg, each of the elastic vibration dampers having a cylindrical portion disposed between an inner circumferential surface of the mounting leg and an outer circumferential surface of the sleeve, and a collar extending from one of opposite ends of the cylindrical portion in a radial outward direction of the cylindrical portion; and
an annular plate through which the fastening force received by the sleeve is applied to the mounting leg through the collar, wherein
each of the elastic vibration dampers is disposed in the mounting leg without adhering to the sleeve and the annular plate,
the annular plate has an elongated protrusion protruding toward the mounting leg, the elongated protrusion spaced from the collar with a predetermined clearance formed radially outside the collar, and
a deformation limit of the collar is defined by the elongated protrusion being in contact with the collar during vibration of the housing, wherein
the elongated protrusion has an end surface at a distal end of the elongated protrusion in a protruding direction from the annular plate toward the mounting leg, and
the end surface of the elongated protrusion is spaced from each of the end surfaces of the mounting leg in a state in which the elongated protrusion is in contact with the collar.

* * * * *